March 7, 1933.  C. A. CAMPBELL  1,900,043
AIR BRAKE
Filed Aug. 28, 1931
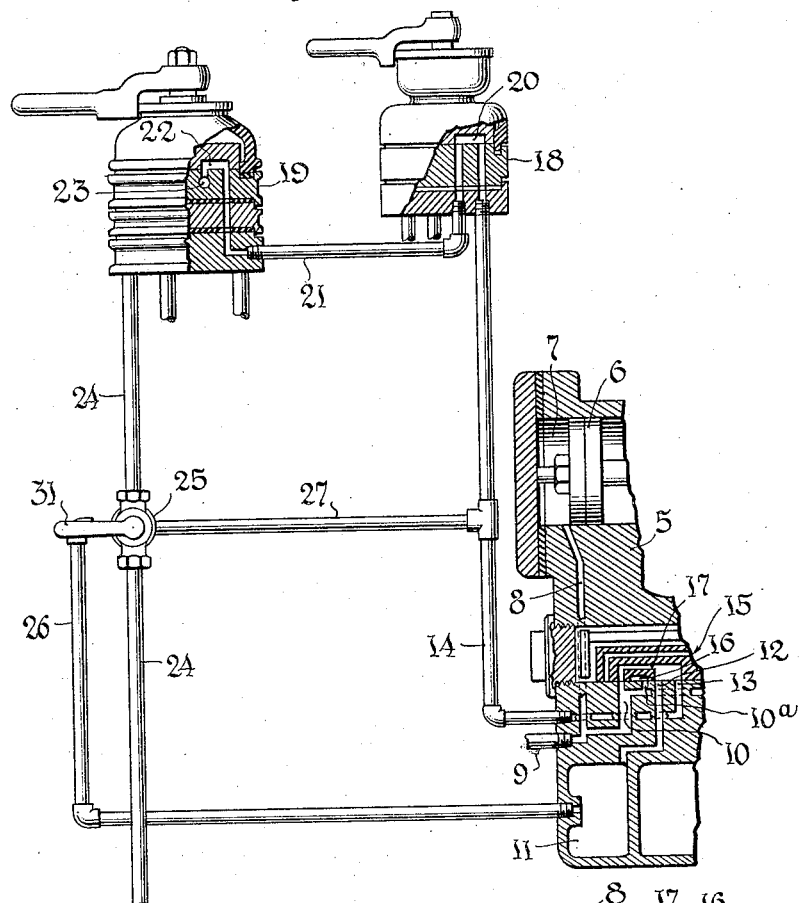
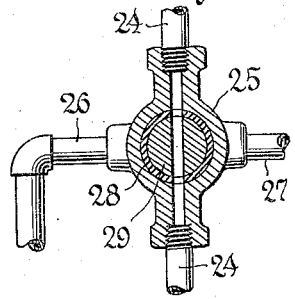
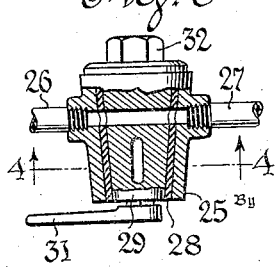
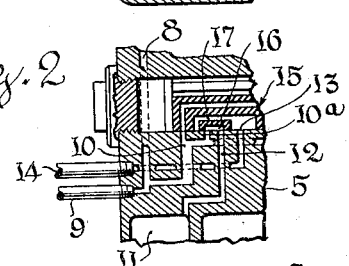
Inventor
Charles A. Campbell
Attorneys Patented Mar. 7, 1933

1,900,043

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR BRAKE

Application filed August 28, 1931. Serial No. 559,995.

This invention relates to fluid pressure brakes and more particularly to the well known E. T. equipment.

The objects of the invention are to improve operative characteristics, and to simplify manipulation in setting for double and for single heading.

As the construction and operation of E. T. equipment is well known to those familiar with this art, only that portion necessary for an understanding of this invention will be shown and described.

A preferred embodiment of the invention is illustrated in the accompanying drawing, in which,—

Fig. 1 is a diagrammatic representation, largely in section, of the engineer's brake valve, independent brake valve and a portion of the distributing valve with the invention applied, showing the engineer's brake valve and independent brake valve, each in running position, and the distributing valve in release position.

Fig. 2 is a fragmentary diagrammatic view of the slide valve and valve seat of the distributing valve, showing the slide valve displaced from the position shown in Fig. 1.

Fig. 3 is a horizontal axial view of the plug cock partly in section.

Fig. 4 is a section on the line 4—4 of Fig. 3.

The body 5 of the distributing valve contains a cylinder 7 in which works application piston 6. This piston, as usual, operates a slide valve (not shown) to admit and exhaust air under pressure to and from the locomotive and tender brake cylinders. The application cylinder 7 in which this piston reciprocates, is connected by the passage 8 to the usual application pipe 9 and by a branch passage to the valve seat ports 10 and 10ª. A port 12 in the valve seat communicates with the application chamber 11, while the port 13 leads to the release pipe 14.

Controlling the valve-seat ports is the usual equalizing slide valve 15 having the cavities 16 and 17 in its face. This valve is actuated by an equalizing piston (not shown) subject on its outer face to brake pipe pressure and responsive to variations of that pressure. The parts so far described will be recognized as conforming to standard practice.

The independent brake valve 18 and the automatic engineer's brake valve 19 also conform in all respects to standard practice. With these valves in the "running" position, as shown in Fig. 1, the release pipe 14 is vented to the atmosphere through the cavity 20 in the rotary valve of the independent brake valve 18, the connecting pipe 21, the cavity 22 of the rotary valve of the automatic brake valve 19 and the exhaust port 23.

The branch pipe 24 which leads from the automatic brake valve 19 to the brake pipe (not shown) is controlled by a special doubleheading cutout plug cock having a body 25. According to the present invention, the cutout cock body is constructed with two separate passageways, one of which controls flow through the brake pipe connection 24, and the other of which controls a shunt connection from the application chamber to release pipe 14. The shunt connection is made up of pipe 26 leading from application chamber 11 to cock body 25 and pipe 27 leading from cock body 25 to pipe 14.

This connection between the application chamber and the release pipe and controlled by the double-heading cock is the principal feature of novelty here disclosed.

Referring to Figs. 3 and 4, the double passage cutout cock comprises the body 25 having a conical bore which receives a bushing 28, and in this bushing the conical plug 29 may be turned by the handle 31. Two separate passageways are formed in the valve body and plug and are so located that in one angular position of the plug both passages are open, and in another both are closed. In the example illustrated the passages are at right angles with each other but this is a detail of design.

The results attained by my invention will be explained by first considering the parts in the positions of Fig. 1. With both brake valves in running position and the equalizing valve 15 in release position, as shown, the application cylinder 7 is connected with atmosphere through passage 8, valve seat port 10, slide valve cavity 17, and valve seat port 13, to the release pipe 14 which exhausts through the independent and automatic brake valves. Application chamber 11 similarly exhausts through port 12, cavity 17, and port 13, into the release pipe. Thus the application piston 6 will assume the position shown and the locomotive brakes will be released.

It sometimes happens that although the independent and automatic brake valves are in running position, the equalizing valve 15 shifts to the position shown in Fig. 2. This may be caused by a sudden jar of the locomotive, or by a pressure differential on the opposite sides of the equalizing piston created by a leaky train pipe, or by overcharging of the system during release.

When the equalizing valve 15 moves to the position shown in Fig. 2, the port 10 is covered and escape of air in the application cylinder 7 through the cavity 17, port 13 and the release pipe 14, is prevented. Further, the connection between ports 12 and 13 through the cavity 17, will be interrupted, and application chamber 11 will not be vented to the atmosphere. With the connection heretofore used, leakage past the slide valve into the port 10, (since there would be no exhaust) would cause pressure to build up in the application cylinder 7. Ultimately such pressure would move the piston 6 and cause the locomotive brakes to creep on.

It will be observed that with the parts in the position of Fig. 2, although the port 10 is blocked, the branch port 10ª is now connected by the cavity 16 with the port 12 leading to the application chamber 11. Since this chamber is connected with the release pipe by the shunt pipes 26 and 27 provided according to this invention, any leakage past the slide valve 15 will escape to the atmosphere. Hence the locomotive brakes can not creep on.

It is evident that the shunt pipes 26 and 27 will not interfere with the normal functions of the distributing valve since release pipe 14 is open to atmosphere only when both brake valves 18 and 19 are in running position.

When double-heading, the brakes of the second locomotive should operate in unison with the brakes of the train. To ensure this, both the automatic and the independent brake valves of the second locomotive are set in "running position". The double-heading cock on the second locomotive is closed as usual. Under these conditions the exhaust through pipe 14 is closed at the double-heading cock. Hence the distributing valve performs its normal functions under control of brake pipe pressure.

The invention offers important advantages over prior attempts to secure somewhat similar results. No change in the construction of either the distributing valve, the automatic brake valve or the independent brake valve is necessary. Both brake valves are carried in normal (running) position on the second engine of a double-headed train. Only one double-heading cock is required, ensuring correct manipulation.

What is claimed is:

1. In a fluid pressure brake, the combination with a distributing valve mechanism including an application cylinder and piston operated by fluid pressure in said cylinder to control the brakes, and an equalizing valve device having a slide valve adapted to connect said application cylinder with an application chamber in effecting an application of the brakes, said distributing valve mechanism having a distributing valve release connection, of an engineer's brake valve and an independent brake valve each having a port connected in series with the corresponding port in the other, said valves conjointly controlling flow from the distributing valve release connection to atmosphere, said engineer's brake valve having a brake pipe connection; a shunt connection from said application chamber to the distributing valve release connection at a point such that the flow through said shunt connection is controlled by said engineer's brake valve and said independent brake valve conjointly; and a double-heading cock controlling said shunt connection and said brake pipe connection, and serving to open and close said connections simultaneously.

2. The combination of claim 1 further characterized in that said serially connected ports are both open when the engineer's brake valve and the independent brake valve are in their running positions.

3. The combination with a brake equipment of the type in which a distributing valve mechanism having an application portion and application chamber is controlled by an equalizing portion, and in which a release connection from the distributing valve is conjointly controlled by an engineer's brake valve with brake pipe connection and an independent brake valve; of a double-heading cock controlling both said brake pipe connection and a shunt connection between the application chamber and said release connection at such a point that flow through said shunt is controlled conjointly by the engineer's brake valve and said independent brake valve, said cock serving to open and close said connections simultaneously.

4. The combination of claim 1, further characterized in that release flow occurring through said distributing valve release connection passes first through the independent brake valve and then through the engineer's brake valve and said shunt connection leads from the application chamber to a point in said distributing valve release connection between the distributing valve and said independent brake valve.

In testimony whereof I have signed my name to this specification.

CHARLES A. CAMPBELL.